(12) United States Patent
Hodrus

(10) Patent No.: US 10,124,786 B2
(45) Date of Patent: Nov. 13, 2018

(54) METHOD FOR DETERMINING A MEASURING POINT OF A HYBRID DECOUPLER OF A HYBRID VEHICLE

(71) Applicant: Schaeffler Technologies AG & Co. KG, Herzogenaurach (DE)

(72) Inventor: Erhard Hodrus, Karlsruhe (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 9 days.

(21) Appl. No.: 14/820,902

(22) Filed: Aug. 7, 2015

(65) Prior Publication Data

US 2016/0046277 A1    Feb. 18, 2016

(30) Foreign Application Priority Data

Aug. 13, 2014  (DE) .................. 10 2014 216 087
Nov. 17, 2014  (DE) .................. 10 2014 223 358

(51) Int. Cl.
*B60W 20/00*   (2016.01)
*B60W 50/00*   (2006.01)
*B60W 10/02*   (2006.01)
*B60W 10/06*   (2006.01)
*B60W 20/15*   (2016.01)

(52) U.S. Cl.
CPC ............ *B60W 20/00* (2013.01); *B60W 10/02* (2013.01); *B60W 10/06* (2013.01); *B60W 20/15* (2016.01); *B60W 50/0098* (2013.01); *B60W 2050/0087* (2013.01); *B60W 2510/0225* (2013.01)

(58) Field of Classification Search
None
See application file for complete search history.

(56) References Cited

U.S. PATENT DOCUMENTS

| | | | | |
|---|---|---|---|---|
| 5,989,153 A | * | 11/1999 | Fischer | F16D 48/066 477/74 |
| 6,190,284 B1 | * | 2/2001 | Kuroda | B60K 6/485 123/179.4 |
| 6,307,277 B1 | * | 10/2001 | Tamai | B60K 6/26 180/65.26 |
| 6,602,161 B2 | * | 8/2003 | Hemmingsen | F16D 48/068 192/3.55 |
| 6,966,868 B2 | * | 11/2005 | Stork | B60W 10/02 477/74 |

(Continued)

FOREIGN PATENT DOCUMENTS

DE   102008030473   1/2009
DE   102010024941   1/2011

*Primary Examiner* — Truc M Do
(74) *Attorney, Agent, or Firm* — Volpe and Koenig, P.C.

(57) ABSTRACT

A method for determining a measuring point of a hybrid decoupler of a hybrid vehicle, which is operated by a hydrostatic clutch actuator, with the hybrid decoupler coupling or decoupling an internal combustion engine and an electro-traction drive. The measuring point is determined by a slow operation of the hybrid decoupler, starting from a position of the hybrid decoupler which it assumes in the idle state, when a defined increase in torque is detected at the electro-traction drive. In the method, the term for measuring adaption is considerably shortened, and the measuring point is adapted at a running internal combustion engine and a stationary electro-traction drive.

5 Claims, 1 Drawing Sheet

(56) References Cited

U.S. PATENT DOCUMENTS

| | | | | |
|---|---|---|---|---|
| 7,784,575 B2* | 8/2010 | Yamanaka | ............... | B60K 6/48 180/65.275 |
| 7,972,235 B2* | 7/2011 | Usoro | ..................... | B60K 6/24 475/5 |
| 8,105,205 B2* | 1/2012 | Reuschel | ............... | B60K 6/387 477/181 |
| 8,392,083 B2 | 3/2013 | Hodrus et al. | | |
| 2003/0104901 A1* | 6/2003 | Fukushima | ............... | B60K 6/36 477/3 |
| 2004/0040760 A1* | 3/2004 | Kadota | .................... | B60K 6/44 180/65.225 |
| 2004/0157704 A1* | 8/2004 | Stork | .................... | B60W 10/02 477/166 |
| 2005/0245349 A1* | 11/2005 | Tabata | .................... | B60K 6/38 477/3 |
| 2007/0216312 A1* | 9/2007 | Ogata | .................... | B60K 6/48 315/131 |
| 2007/0219045 A1* | 9/2007 | Ogata | .................... | B60K 6/48 477/3 |
| 2008/0009388 A1* | 1/2008 | Tabata | .................... | B60K 6/445 477/2 |
| 2008/0039261 A1* | 2/2008 | Cho | .................... | B60K 6/365 475/5 |
| 2010/0108420 A1* | 5/2010 | Keiji | .................... | B60K 6/365 180/65.275 |
| 2010/0248893 A1* | 9/2010 | Shimanaka | ............... | B60K 6/48 477/5 |
| 2010/0282561 A1* | 11/2010 | Rinck | .................... | F16D 48/06 192/48.3 |
| 2011/0087394 A1* | 4/2011 | Shimanaka | ............ | B60K 6/365 701/22 |
| 2013/0066530 A1* | 3/2013 | Holzer | .................... | F16D 48/06 701/68 |
| 2013/0179030 A1* | 7/2013 | Kneissler | ................ | F16D 48/06 701/33.7 |
| 2013/0274969 A1* | 10/2013 | Wang | .................... | B60W 10/08 701/22 |
| 2013/0297105 A1* | 11/2013 | Yamazaki | ................ | B60K 6/48 701/22 |
| 2013/0325231 A1* | 12/2013 | Park | .................... | B60W 20/10 701/22 |
| 2014/0067174 A1* | 3/2014 | Park | .................... | F16H 61/061 701/22 |
| 2014/0129104 A1* | 5/2014 | Park | .................... | F16D 48/06 701/68 |

\* cited by examiner

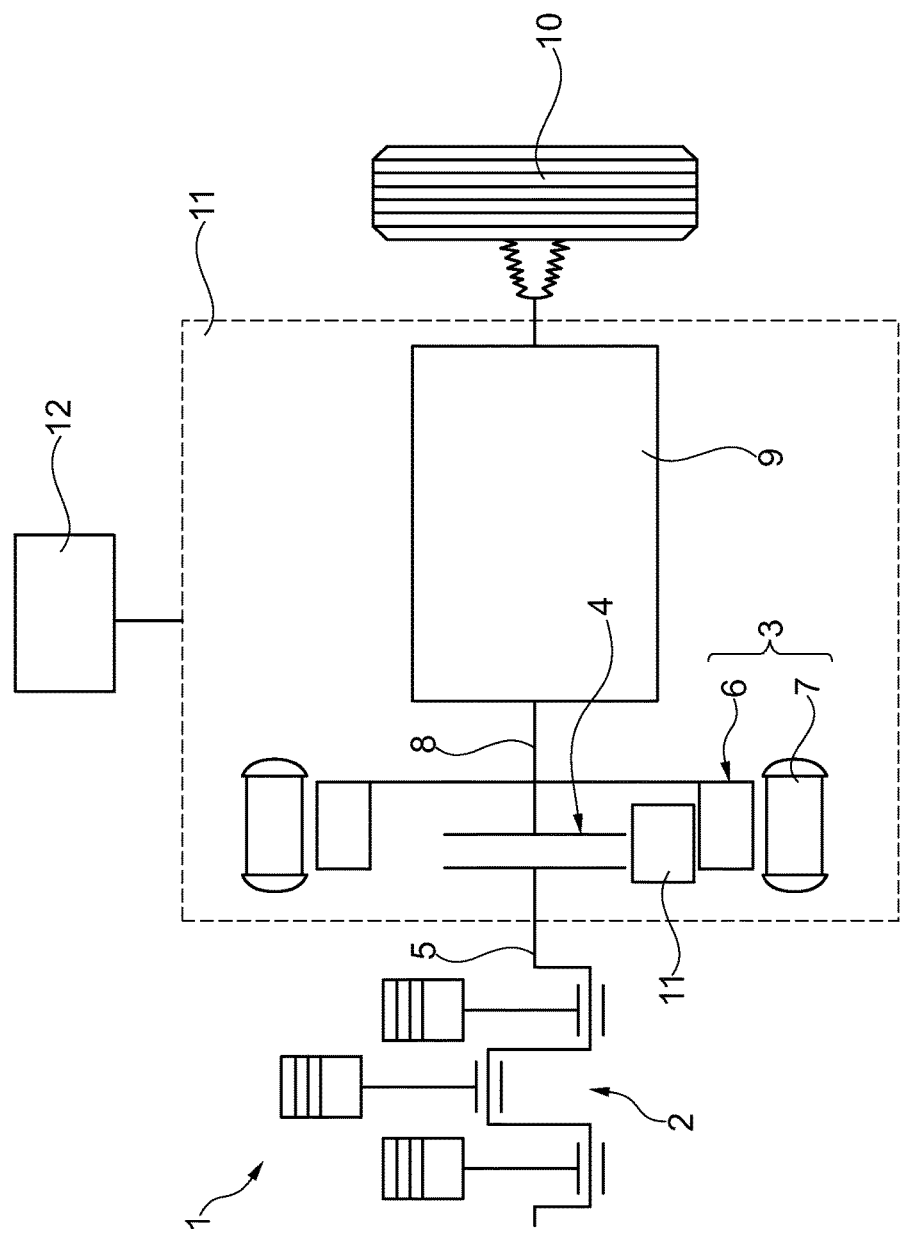

METHOD FOR DETERMINING A MEASURING POINT OF A HYBRID DECOUPLER OF A HYBRID VEHICLE

INCORPORATION BY REFERENCE

The following documents are incorporated herein by reference as if fully set forth: German Patent Application No. 102014216087.1, filed Aug. 13, 2014; and German Patent Application No. 102014223358.5, filed Nov. 17, 2014.

BACKGROUND

The invention relates to a method for determining a measuring point of a hybrid decoupler of a hybrid vehicle, which is operated by a hydrostatic clutch actuator, with the hybrid decoupler separating an internal combustion engine from an electro-traction drive, or connecting it thereto, and the measuring point being detected by a slow activation of the hybrid decoupler, starting from a position of the hybrid decoupler which it assumed in the idle state, when a defined moment increase is detected at the electro-traction drive.

DE 10 2010 024 941 A1 discloses a method for controlling a duplex clutch transmission with at least two partial drive trains, with it being possible to couple each of them via a clutch to an internal combustion engine. During drive operation of the vehicle, comprising the duplex clutch transmission, the measuring point of the clutch is determined independent from the engine torque. This measuring point is here determined during the start of operation of the vehicle and then adapted during operation of the vehicle.

In a hybrid vehicle with a hybrid drivetrain the driving resistance can be overcome by two independent energy sources, such as fuel of an internal combustion engine and electric energy of the traction battery of an electric motor, by way of conversion into mechanic energy. According to DE 10 2008 030 473 A1 a method is known for determining the measuring point of an automated hybrid decoupler in a hybrid drivetrain. The measuring point of the hybrid decoupler, which is arranged between an internal combustion engine and an electro-traction drive, is determined in stopped internal combustion engines by slowly closing the hybrid decoupler and measuring the influence of the connecting hybrid decoupler upon an electric machine of the electro-traction drive, which rotates with a predetermined speed. When measuring the hybrid decoupler in a stopped internal combustion engine, here noise and vibrations develop, which are experienced as disturbing by the driver. Furthermore, situations occur rarely during the driving operation for the determination of the measuring point, in which the rotating electric motor is switched against a stopped internal combustion engine.

SUMMARY

The invention is therefore based on the objective to provide a method for determining a measuring point of a hybrid decoupler of a hybrid vehicle, in which the disturbing noises and vibrations are prevented and, in spite thereof, the measuring point is determined reliably.

According to the invention the objective is attained such that the measuring point is adapted during the operating internal combustion engine and the stopped electro-traction drive. This is advantageous in that the noises and vibrations experienced as disturbing are missing during such a measuring point adaption. Furthermore, such a rotating internal combustion engine ensures that the tips of the flat springs of the clutch also rotate and here tolerances keep the engaging bearing of the clutch from tipping, which results in that widely varying measuring points are prevented. If the hybrid decoupler is moved towards the position of the measuring point, the stationary electric motor is entrained at some point of time such that the observed torque of the electro-traction drive increases by the speed control. Thus, even in a rotating internal combustion engine and a shut-off electric motor the measuring point can be determined in a particularly quick fashion, because here, too, a change of the torque can be proven at the electric motor of the electro-traction drive.

Advantageously, the stationary electro-traction drive is speed-controlled. Due to the fact that it is not necessary to start the electric motor of the electro-traction drive, here time savings are achieved in the determination of the measuring point, because the adaption process can be started immediately. The time required here can be shortened considerably, because it is not necessary to accelerate the stationary electric motor for speed control, thus the measuring point adaption no longer needs to be stopped.

In a further development the internal combustion engine is operated with an idling speed. By the vibrations developing when the internal combustion engine is running frictions within the system are avoided, so that the measuring point can be better determined.

In a further development the internal combustion engine is decoupled from the drivetrain during the adaption of the measuring point. This way it is ensured that the vibrations of the drivetrain never lead to any distortion when the measuring point is determined.

In one embodiment the measuring point is adapted during the operation of the hybrid vehicle. This offers considerably more opportunities for adaption of the measuring point during driving than in a shut-off internal combustion engine. This way, for example when the internal combustion engine is running, e.g., at a traffic light, the adaption of the measuring point can be performed.

BRIEF DESCRIPTION OF THE DRAWINGS

The invention allows numerous embodiments. One of them shall be explained in greater detail based on the figures shown in the drawing.

In the drawings:

FIG. 1 is a principle illustration of a hybrid drive of a hybrid vehicle.

DETAILED DESCRIPTION FO THE PREFERRED EMBODIMENTS

FIG. 1 shows a principle illustration of a drivetrain 1 of a hybrid vehicle. This drivetrain 1 comprises an internal combustion engine 2 and an electric motor 3. Between the internal combustion engine 2 and the electric motor 3, directly downstream the internal combustion engine 2, a hybrid decoupler 4 is arranged. The internal combustion engine 2 and the hybrid decoupler 4 are connected to each other via a crankshaft 5. The electric motor 3 comprises a rotor 6, which can be rotated, and a stationary stator 7. The driven shaft 8 of the hybrid decoupler 4 is connected to the transmission 9, which comprises another coupling element, not shown, for example a second clutch or a torque converter, arranged between the electric motor 3 and the transmission 9. The transmission 9 transmits the torque generated by the internal combustion engine 2 and/or the electric motor 3 to the driving wheels 10 of the hybrid vehicle. Here, the hybrid decoupler 4 and the transmission 9 form a transmission system 11, which is controlled by a hydrostatic clutch actuator 12, used in combination with the hybrid decoupler 4, which is closed in the idle state. The hybrid decoupler 4 is operated by the hydrostatic clutch actuator 12 over a hydrostatic stroke. The master piston in the master cylinder, which is arranged in the hydrostatic clutch actuator, is adjusted by the electric motor. This way, a slave piston in the slave cylinder is actuated via hydraulic fluid in the hydrostatic stroke. The slave piston of the slave cylinder acts here upon the tips of the lever springs of a flat spring, which then lifts off a clutch disk, upon actuation of a clutch plate, and this way the transfer of torque is interrupted by the hybrid decoupler 4. In the idle state, the pre-stressed lever spring closes the hybrid decoupler 4.

The measuring point is of particular importance for controlling the hybrid decoupler 4 and thus it is determined during the initial start of operation of the hybrid vehicle and adapted during the drive operation of the hybrid vehicle. The adaption of the measuring point occurs during a rotating internal combustion engine 2 when the hybrid vehicle is in operation. The internal combustion engine 2 runs here in the idling mode. By speed control the electric motor 3 of the electro-traction drive is kept in the stationary state. During the adaption of the measuring point the hybrid decoupler 4 is opened and is slowly moved into the closed state. At the point of time at which the decoupler 4 begins to transmit a torque, the electric motor 3 of the electro-traction drive is slightly entrained. Due to the speed control connected to the electro-traction drive the torque of the electric motor 3 of the electro-traction drive increases. When a defined increase in torque is given, the present measuring point is detected. Due to the fact that the electric motor 3 of the electro-traction drive is not rotating at the start of the measuring point detection process, any drastic reductions in rotation are reliably prevented. During the adaption process of the measuring point it must be ensured that the drive train is decoupled from the internal combustion engine.

LIST OF REFERENCE CHARACTERS

1 Drivetrain
2 Internal combustion engine
3 Electric motor
4 Hybrid decoupler
5 Crankshaft
6 Rotor
7 Stator
8 Driven shaft
9 Transmission
10 Driving wheels
11 Transmission system
12 Clutch actuator

The invention claimed is:

1. A method for determining a modified measuring point of a hybrid decoupler of a hybrid vehicle, which is operated by a hydrostatic clutch actuator, said hybrid decoupler coupling or decoupling an internal combustion engine and an electro-traction drive, the method comprising:
   determining an initial measuring point by slow operation of the hybrid decoupler, starting from a position of the hybrid decoupler in an idle state,
   detecting a defined increase in torque at the electro-traction drive, and
   then adapting the initial measuring point to an adapted measuring point while the internal combustion engine is running and the electro-traction drive is stopped.

2. The method according to claim 1, wherein the electro-traction drive is speed-controlled.

3. The method according to claim 1, wherein the internal combustion engine is operated at an idling speed.

4. The method according to claim 1, wherein during the adaption of the initial measuring point, the internal combustion engine is decoupled from a drivetrain.

5. The method according to claim 1, wherein the initial measuring point is adapted during operation of the hybrid vehicle.

* * * * *